April 11, 1950          G. W. DOOLEY          2,503,474
RESILIENT ROTARY EARTH TILLER
Filed Nov. 15, 1948          2 Sheets-Sheet 1
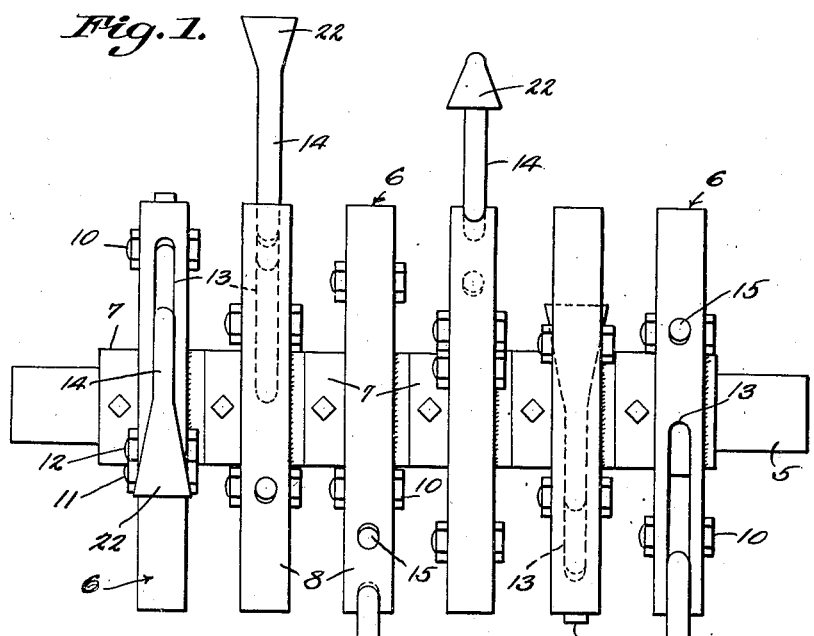
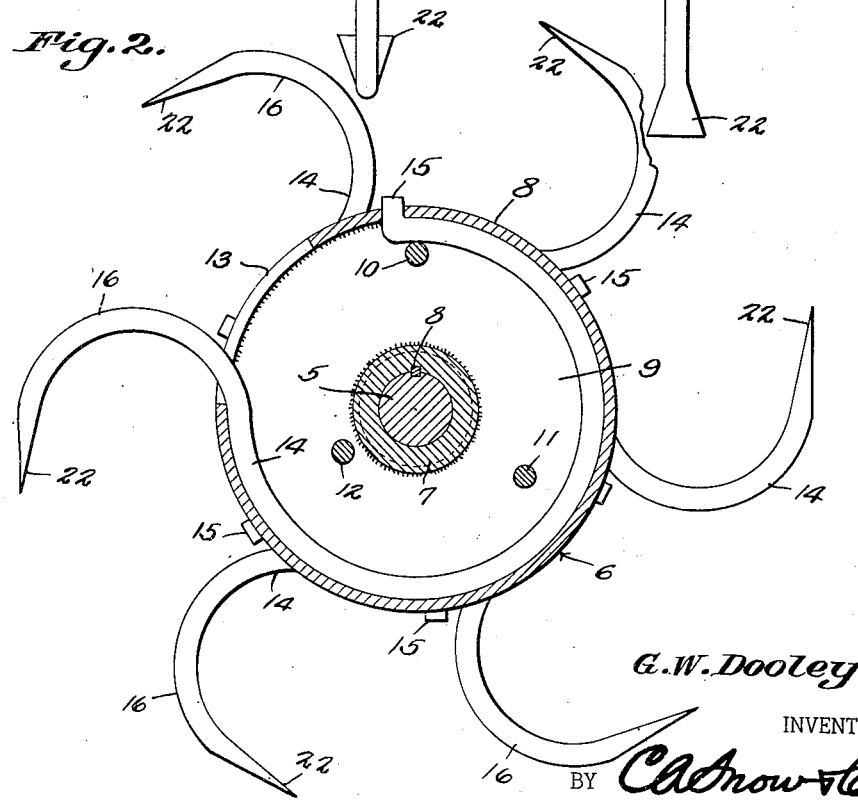
G. W. Dooley
INVENTOR
BY *C. A. Snow & Co.*
ATTORNEYS.

April 11, 1950 G. W. DOOLEY 2,503,474
RESILIENT ROTARY EARTH TILLER
Filed Nov. 15, 1948 2 Sheets-Sheet 2
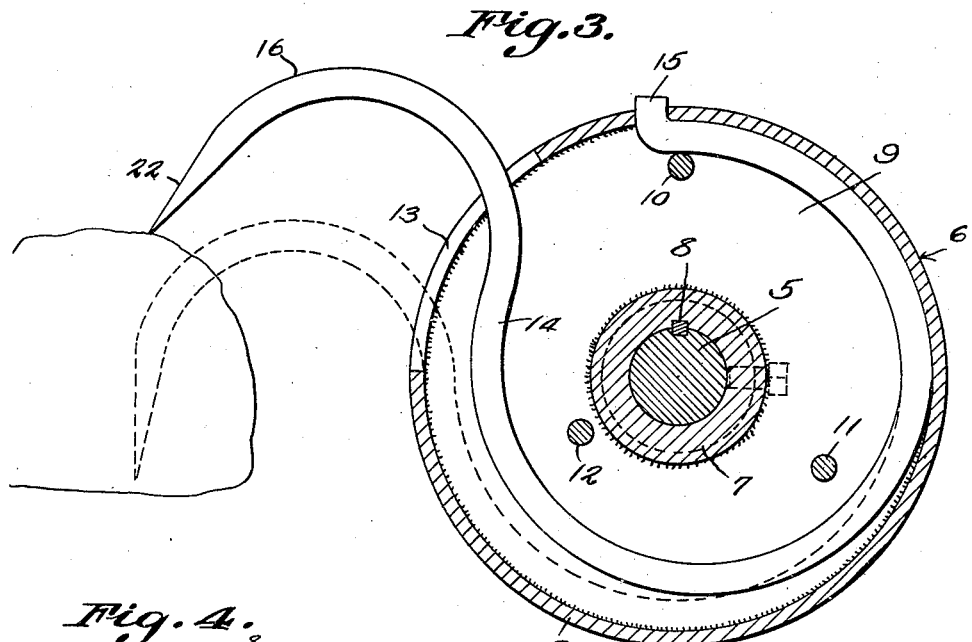
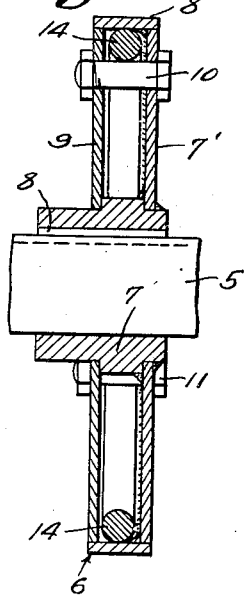
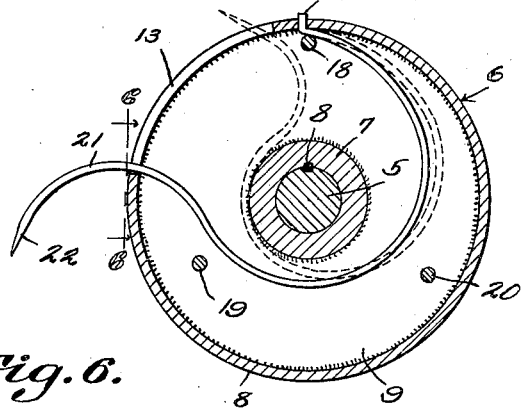
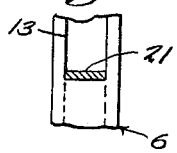
G. W. Dooley
INVENTOR
BY C. A. Snow & Co.
ATTORNEYS.

Patented Apr. 11, 1950

2,503,474

UNITED STATES PATENT OFFICE 2,503,474

RESILIENT ROTARY EARTH TILLER

George W. Dooley, Ottawa, Kans., assignor to The Warner Steel Products Co., Inc., Ottawa, Kans.

Application November 15, 1948, Serial No. 60,010

2 Claims. (Cl. 97—216)

This invention relates to rotary earth tillers, and more particularly to the construction of the tines of the tiller.

An important object of the invention is to provide a rotary earth tiller embodying spring tines so constructed and arranged with respect to the supporting housing that the wrapping of weeds and trash around the shaft of the tiller to clog the points of the tines of the tiller, will be eliminated.

Still another object of the invention is to provide a rotary earth tiller wherein the tines are exceptionally flexible and supported in such a way that when the tines meet with obstructions, the tines will spring rearwardly, and when the tines pass the obstructions, the tines will snap back to their normal positions, the tines contacting with one edge of the openings of the supporting housing in which the tines move to cause a sudden jar resulting in the foreign matter collected on the tines being thrown therefrom to clear the tines.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 1 is an elevational view of the tine supporting shaft of a rotary earth tilling machine illustrating tines as mounted thereon.

Fig. 2 is a vertical sectional view through the tine supporting shaft and tine housing at one end of the shaft.

Fig. 3 is a sectional view through the tine supporting shaft and housing mounted thereon, illustrating the movement of the tine as it flexes, due to engagement with an obstruction on the surface or field over which the machine is moving.

Fig. 4 is a sectional view taken at right angles to Fig. 2 of the drawings.

Fig. 5 is a sectional view through a tine housing and supporting shaft, illustrating the tine as constructed of flat material.

Fig. 6 is a sectional view taken on line 6—6 of Fig. 5.

Referring to the drawings in detail, the reference character 5 indicates the shaft of a rotary soil tiller on which the tines of the tiller are supported for rotary movement.

As clearly shown by Fig. 1 of the drawings, the tiller comprises a series of tine supports 6 which tine supports are in the form of housings or drums formed with hubs 7 that have keyways to receive the keys 8 that also are disposed within corresponding grooves of the shaft 5, securing the tine supports or housings to the shaft.

Each housing embodies a side embodying the disc-like plate 7' to which the wide band 8 is welded, the opposite side of the housing being closed by the disc 9, the disc 9 being held to the plate 7', by means of the bolts 10, 11 and 12.

The flat band member 8 is formed with a cut out portion indicated at 13 which provides a clearance for the flexible tine 14 which has its end 15 extended at right angles and fitted in an opening formed in the band 8. The bolt 10 is so disposed with respect to the opening in which the end 15 of the tine 14 is positioned, that after the end 15 has been positioned in the opening, the bolt will engage the tine at a point adjacent to the end 15 and securely hold the tine in position, the tine being removable only by removing the bolt 10.

The bolts 11 and 12 which also secure the disc 9 in position, are so arranged that the tine 14 will have ample room for movement as it flexes, due to the tine contacting with obstructions on the surface over which the device is being moved. As clearly shown by Fig. 5, the tines are of such length that they will extend through the cut out portions 13, the hooked ends 16 thereof extending appreciable distances beyond the band 8. When the tines move inwardly, due to contact with an obstruction on the surface, it will be seen that the tines will move into such positions that the edges of the cut out portion 13 will tend to clear trash and roots which may be picked up on the tines and which collect on the tines. It will of course be obvious that when the tines are moved over the obstruction, the tines will be returned to their normal active positions by their own flexibility.

In the form of the invention as shown by Figs. 5 and 6 of the drawings, instead of the tines being constructed of material round in cross section, the tines are constructed of a flat material, the openings in the housings being of course constructed to properly receive the flat tines so that they may move therein.

In this form of the invention, the tines are formed with right angled ends 17 that fit into openings formed in the housings to secure the tines in position.

Bolts 18 cooperate with the housing in securing the cover disc to the housing and at the same time contact with the tine associated therewith in such a way as to prevent the tine from becoming displaced from its opening.

Bolts 19 and 20 are also used to hold the cover discs on the housings. The tine is indicated by the reference character 21, and in Fig. 5 of the drawings, the tine 21 is shown as moved rearwardly to the position which it will assume when the tine strikes an obstruction in the surface over which the machine is moved.

It will of course be understood that in the construction of the tiller, the housings which support the tines, will be so arranged around the shaft with respect to each other, that the tines will be spaced equal distances apart to provide a complete rotor. It will of course be understood that the number of housings and tines, may be varied to meet the requirements of use.

In both forms of the invention, it is to be understood that the free ends of the tines are flattened and formed into blades 22.

Having thus described the invention, what is claimed is:

1. In a rotary soil tiller, a rotary supporting shaft, a plurality of tine supporting housings secured to the shaft, each housing having an elongated opening in its periphery and having an opening adjacent to one end of the elongated opening, a flexible tine held in each housing, the tine having a right angled end fitted in the opening at one end of the elongated opening, said tine being curved around the shaft and having a hooked end extended through the elongated opening of the housing, said tine being movable longitudinally of the elongated opening by contact with obstructions in the ground surface over which the tiller is moving, and the walls of said elongated opening providing clearing surfaces for clearing the tine of foreign matter, as the tine moves within the elongated opening.

2. In a rotary soil tiller, a rotary supporting shaft, tine supporting housings secured to the shaft, each housing having an elongated opening formed in its periphery and having an opening adjacent to one end of the elongated opening, a flexible tine member having a right angled end fitted in the opening at one end of the elongated opening, a bolt extending through the sides of the housing adjacent to the tine holding the right angled end of the tine in the opening in which it is positioned, the opposite end of the tine moving through the elongated opening removing foreign matter from the tine as the shaft and tines rotate.

GEORGE W. DOOLEY.

REFERENCES CITED

The following references are of record in the file of this patent:

UNITED STATES PATENTS

| Number | Name | Date |
|---|---|---|
| 598,445 | Shepherd | Feb. 1, 1898 |
| 1,102,979 | Connor | July 7, 1914 |

FOREIGN PATENTS

| Number | Country | Date |
|---|---|---|
| 340,682 | Germany | Sept. 15, 1921 |